(12) United States Patent
Hahn

(10) Patent No.: US 11,994,076 B2
(45) Date of Patent: May 28, 2024

(54) MULTI-STEP PRESSURIZING VALVE SYSTEM

(71) Applicant: Michael L. Hahn, Fort Collins, CO (US)

(72) Inventor: Michael L. Hahn, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 46 days.

(21) Appl. No.: 17/219,485

(22) Filed: Mar. 31, 2021

(65) Prior Publication Data
US 2022/0316411 A1   Oct. 6, 2022

(51) Int. Cl.
  *F02C 9/26*   (2006.01)
  *F02C 7/232*  (2006.01)
  *F02C 7/32*   (2006.01)
  *G05D 16/00*  (2006.01)

(52) U.S. Cl.
  CPC ............. *F02C 9/263* (2013.01); *F02C 7/232* (2013.01); *F02C 7/32* (2013.01); *G05D 16/028* (2019.01); *F05D 2260/406* (2013.01); *F05D 2260/606* (2013.01)

(58) Field of Classification Search
  CPC .... F02C 7/22; F02C 7/232; F02C 7/32; F02C 9/263; F02C 7/236; G05D 16/028
  See application file for complete search history.

(56) References Cited

U.S. PATENT DOCUMENTS

| | | | | |
|---|---|---|---|---|
| 2,815,714 A | * | 12/1957 | Jacobson | F23K 5/04 417/409 |
| 3,608,575 A | * | 9/1971 | Jurisch | F15B 13/0417 137/115.1 |
| 4,245,964 A | * | 1/1981 | Rannenberg | F04C 14/02 60/734 |
| 4,591,317 A | * | 5/1986 | Markunas | F02C 7/236 417/310 |
| 6,102,001 A | * | 8/2000 | McLevige | F02C 9/26 123/387 |
| 7,770,388 B2 | * | 8/2010 | Desai | F02C 7/236 60/420 |

(Continued)

FOREIGN PATENT DOCUMENTS

| | | | |
|---|---|---|---|
| EP | 2124123 A2 | 11/2009 | |
| EP | 2511499 A2 | 10/2012 | |

*Primary Examiner* — Alain Chau
(74) *Attorney, Agent, or Firm* — Reinhart Boerner Van Deuren P.C.

(57) ABSTRACT

Embodiments of a fuel system are disclosed. The fuel system includes a bypass valve (BPV), a fuel metering valve (FMV), a flow sense valve (FSV), and an actuator regulating valve (ARV). The BPV includes a BPV valve member that regulates fuel flow from a BPV inlet to a BPV outlet. The position of the BPV valve member is controlled by pressures at an inlet and an outlet of the FMV. The FSV includes an FSV valve member that regulates fuel flow from an FSV inlet to an FSV outlet. The ARV includes an ARV inlet that is in fluid communication with the FSV outlet, and fuel flow through an ARV outlet regulates downstream actuators. The position of the FSV valve member to produce fuel flow through the FSV outlet to the ARV inlet is controlled at least in part by a pressure at the BPV outlet.

20 Claims, 3 Drawing Sheets

(56) References Cited

U.S. PATENT DOCUMENTS

| | | | | |
|---|---|---|---|---|
| 8,256,445 B2* | 9/2012 | Arnett | ............... | G05D 16/166 |
| | | | | 137/115.15 |
| 8,834,134 B2* | 9/2014 | Baker | ............... | F02C 7/236 |
| | | | | 123/446 |
| 9,140,191 B2* | 9/2015 | Haugsjaahabink | ....... | F02C 7/22 |
| 9,388,778 B2* | 7/2016 | Baker | ............... | F02M 37/0052 |
| 10,126,762 B2 | 11/2018 | Loos et al. | | |
| 10,502,138 B2* | 12/2019 | Reuter | ............... | F02C 9/263 |
| 10,900,421 B2* | 1/2021 | Hahn | ............... | G05B 5/01 |
| 2004/0025492 A1* | 2/2004 | Griffiths | ............... | F02C 7/228 |
| | | | | 60/39.281 |
| 2006/0021324 A1* | 2/2006 | Eick | ............... | F02C 7/232 |
| | | | | 60/39.281 |
| 2008/0289338 A1* | 11/2008 | Desai | ............... | F04C 14/02 |
| | | | | 60/734 |
| 2009/0320937 A1* | 12/2009 | Arnett | ............... | G05D 16/166 |
| | | | | 137/535 |
| 2012/0042657 A1* | 2/2012 | Hodinot | ............... | F02C 7/232 |
| | | | | 60/734 |
| 2012/0045348 A1 | 2/2012 | Garry | | |
| 2012/0156061 A1* | 6/2012 | Baker | ............... | F02C 7/236 |
| | | | | 417/288 |
| 2012/0261000 A1* | 10/2012 | Futa | ............... | F02C 7/232 |
| | | | | 137/101 |
| 2012/0315152 A1* | 12/2012 | Baker | ............... | F02C 7/22 |
| | | | | 417/302 |
| 2013/0255270 A1* | 10/2013 | Gibbons | ............... | F02C 7/232 |
| | | | | 60/776 |
| 2014/0311599 A1* | 10/2014 | Haugsjaahabink | ....... | F02C 9/30 |
| | | | | 137/565.11 |
| 2015/0020884 A1* | 1/2015 | Baker | ............... | F02C 9/263 |
| | | | | 137/565.11 |
| 2016/0069465 A1* | 3/2016 | Suzuki | ............... | F16K 31/124 |
| | | | | 137/625.48 |
| 2017/0292451 A1* | 10/2017 | Reuter | ............... | F02C 7/22 |
| 2017/0328567 A1* | 11/2017 | Crowley | ............... | F23N 5/003 |
| 2020/0123986 A1* | 4/2020 | Hahn | ............... | G05B 6/02 |

\* cited by examiner

MULTI-STEP PRESSURIZING VALVE SYSTEM

FIELD OF THE INVENTION

This invention generally relates to a fuel system for a turbine engine and more particularly to a fuel system configured to regulate fuel flow to actuators and motive systems of an aircraft.

BACKGROUND OF THE INVENTION

Fuel in a fuel system for turbine engine applications may be used not only for combustion purposes but also to control actuators and motive systems of an aircraft in which the turbine engine is installed. Conventional fuel systems include an inlet pressurizing valve that sets the pressure of the system, and a metering valve in combination with a bypass valve regulates the flow of fuel as a control fluid for the actuators and motive systems. However, as will be discussed below, such systems required a high minimum pressure differential for actuator flow, making ground maintenance or low speed actuation difficult or impossible to achieve. Additionally, the high minimum pressure differential requires a relatively large pump size because leakage is proportional to the square root of the pressure differential.

FIG. 3 depicts such a conventional fuel system 10. In the fuel system 10, high pressure fuel enters the fuel system 10 at inlet 12 and flows to an inlet pressurizing valve (IPV) 14. The IPV 14 sets a pressure $P_{sf}$ on actuator line 18. Fuel flows from the high pressure inlet 12 to the actuator line 18 through a wash filter 20. Fuel on the actuator line 18 flows through the IPV 14 to a regulating valve 24 for downstream actuators (not shown). The IPV 14 includes an IPV valve member 26. The position of the IPV valve member 26 is determined on one side by the high pressure fuel from the inlet 12 and on the countervailing side by a spring 28 and return pressure $P_b$. In certain conventional systems, the pressure differential across the IPV valve member 26 to open flow to the regulating valve 24 can be as high as 350 psid.

Because the fuel supplied to the regulating valve 24 for the actuators is controlled by the IPV 14, the position of the IPV valve member 26 to allow flow to the regulating valve 24 is dependent on the high pressure fuel from the inlet 12. In particular, in the fuel system 10, a pump speed of at least 15% is necessary to provide a high enough pressure to put the IPV valve member 26 in a position to allow flow to the regulating valve 24. This pump speed is too high to allow movement of the actuators for ground maintenance functions. Further, IPV 14 requires a relatively high pressurization setting (350 psid), which consequently drives selection of a relatively larger pump size than might otherwise be required for operation of the fuel system 10.

Upon opening of the IPV 14, fuel flows along fuel line 30 to an inlet port 32 of a bypass valve (BPV) 34 and to an inlet port 36 of the FMV 22. Fuel entering the inlet port 32 of the BPV 34 exits through an outlet port 38. The amount of fuel flowing from the first inlet port 32 to the first outlet port 38 through the BPV 34 is determined by the position of a BPV valve member 40, which is influenced by pressure feedback from the fuel system 10 in order to substantially maintain the mass flow rate of the fuel flow to the discharge as discussed below.

One source of feedback is the first pressure $P_1$ on the fuel line 30. As can be seen in FIG. 3, line 48, which is fluidly connected to fuel line 30, provides fuel at the first pressure $P_1$ to one side of the BPV valve member 40. The FMV 22 provides another source of feedback in the form of second pressure $P_2$ from fuel flowing through a second outlet port 44 of the FMV 22. More particularly, the second pressure $P_2$ is applied to an end of the BPV valve member 40 that is opposite to the first pressure $P_1$. Additionally, a spring 50 applies a force to the same end of the BPV valve member 40 as the second pressure $P_2$.

On the downstream end of the fuel system 10, fuel at pressure $P_2$ exits the second outlet port 44 of the FMV 22 to a discharge pressurizing valve (DPV) 52 over line 42. The DPV 52 includes a DPV valve member 54 that controls flow through first DPV outlet 56 to a downstream fuel manifold of an engine and that controls, through a second DPV outlet 58, an ecology function of the engine that removes fuel from the engine manifolds upon cessation of engine operation. The position of the DPV valve member 54 is controlled on one end by the fuel at pressure $P_2$ and at the other end by a spring 60 and by return pressure $P_b$.

In the fuel system 10 so described, an issue that can arise based on the arrangement of the IPV 14 at the inlet of the BPV 20 is that the IPV 14 may be parked while metering flow to the BPV 20. This can cause flow to the BPV 20 to reduce, producing errors that are caused by draws from the actuation line 18 to the regulating valve 42.

The fuel system disclosed herein overcomes the disadvantages associated with such conventional fuel systems. These and other advantages of the invention, as well as additional inventive features, will be apparent from the description of the invention provided herein.

BRIEF SUMMARY OF THE INVENTION

Embodiments of the fuel system described herein allow actuation just above start speeds and reduce sensitivity of the fuel metering unit to downstream pressure variation. In comparison to the conventional system described above, this is accomplished in part by removing the inlet pressurizing valve intermediate of the high pressure fuel inlet and the bypass valve. Thus, according to embodiments of the presently disclosed fuel system, the high pressure fuel is provided directly to the inlet of the bypass valve, and the actuators are controlled by the discharge of the bypass valve, thereby allowing control of the actuators at a lower pressure differential (e.g., as low as 90 psid). In this way, the system is pressurized in steps such that an initial system pressure allows for low speed movement of the actuators, and after initial pressurization for the actuators, the fuel system can be further pressurized for high speed engine operation.

In one aspect, embodiments of the present disclosure relate to a fuel system. The fuel system includes a bypass valve (BPV) having a BPV inlet, a BPV outlet, and a BPV valve member. The BPV inlet is configured to receive fuel flow at a first pressure, and the BPV valve member regulates fuel flow from the BPV inlet to the BPV outlet at a second pressure. The fuel system also includes a fuel metering valve (FMV) having an FMV inlet and an FMV outlet. The FMV inlet is configured to receive fuel flow at a third pressure, and fuel flow from the FMV outlet is at a fourth pressure. Further, the fuel system includes a flow sense valve (FSV) having an FSV inlet, an FSV outlet, and an FSV valve member. The FSV inlet is configured to receive fuel flow at the third pressure, and the FSV valve member regulates fuel from the FSV inlet to the FSV outlet. Fuel from the FSV outlet is configured to control downstream actuators. A position of the BPV valve member to produce fuel flow through the BPV outlet at the second pressure is controlled at a first end by the third pressure and at a second end by the fourth pressure and a biasing element. A position of the FSV valve member to produce fuel flow through the FSV outlet to the ARV inlet is controlled at least in part by the second pressure.

In one or more embodiments of the fuel system, a first pressure differential between the third pressure and the fourth pressure is 90 psid or less. In certain such embodiments, a second pressure differential across the FSV valve member to provide fuel flow through the FSV outlet is 90 psid or less.

In one or more embodiments, the fuel system further includes a discharge pressurizing valve (DPV) having a DPV inlet, a first DPV outlet, and a second DPV outlet. Flow from the DPV inlet to the first DPV outlet and to the second DPV outlet is controlled by a DPV valve member. The DPV inlet receives fuel flow from the FMV outlet at the fourth pressure. In certain embodiments, the first DPV outlet provides fuel flow to a downstream fuel manifold, and the second DPV outlet provides ecology flow.

In one or more embodiments, the fuel system includes an actuator regulating valve (ARV) having an ARV inlet and an ARV outlet. The ARV inlet is in fluid communication with the FSV outlet, and fuel flow through the ARV outlet regulates the downstream actuators at a fifth pressure. In certain embodiments, such a fuel system also includes a discharge pressurizing valve (DPV). The DPV includes a DPV inlet, at least one DPV outlet, and a DPV valve member that controls fuel flow from the DPV inlet to the at least one DPV outlet. The DPV inlet receives fuel flow from the FMV outlet at the fourth pressure, and a flow bridge is provided between the ARV and the DPV such that fuel flow at the fifth pressure biases a DPV valve member against the fuel flow at the fourth pressure.

In one or more embodiments, the fuel system includes a wash filter provided on a first line carrying fuel at the first pressure. The first line is in fluid communication with the BPV inlet, and fuel flows through the wash filter at the third pressure to a second line in fluid communication with the FMV inlet and the FSV inlet.

In another aspect, embodiments of the present disclosure relate to a control system for one or more actuators. The control system includes a bypass valve (BPV) having a BPV inlet and a BPV outlet, a flow sense valve (FSV) having an FSV inlet, an FSV outlet, and an FSV valve member, and an actuator regulating valve (ARV) having an ARV inlet and an ARV outlet. Fuel flow through the BPV outlet applies a pressure to the FSV valve member. The ARV inlet is in fluid communication with the FSV outlet. Fluid is able to flow from the FSV inlet to the FSV outlet at a minimum pressure differential across the FSV valve member of 90 psid or less, and flow from the ARV outlet controls the one or more actuators.

In certain embodiments of the control system, the minimum pressure differential is 50 psid or less.

In one or more embodiments, the ARV provides a pressure bridge to a discharge pressurizing valve configured to control fuel flow to a fuel manifold and to an ecology system.

In one or more embodiments, fuel flow from the BPV inlet to the BPV outlet is provided at a pressure differential of 90 psid or less across a BPV valve member. In certain such embodiments, the control system further comprising a fuel metering valve (FMV) having an FMV inlet and an FMV outlet, the FMV outlet being in fluid communication with a discharge pressurizing valve configured to regulate fuel flow to a fuel manifold. Fuel is at a first pressure at the FMV inlet and at a second pressure at the FMV outlet, and the pressure differential across the BPV valve member is a difference between the first pressure and the second pressure.

In a further aspect, embodiments of the present disclosure relate to a method in which fuel is supplied to a first inlet of a bypass valve, and fuel from a first outlet of the bypass valve is discharged such that the fuel from the first outlet of the bypass valve applies a pressure to a valve member of a flow sense valve. Flow from a second inlet of the flow sense valve to a second outlet of flow sense valve is regulated based on a position of the valve member of the flow sense valve. A minimum pressure differential across the valve member to permit flow from the second inlet to the second outlet is 90 psid or less, and flow from the second outlet controls one or more downstream actuators.

In certain such embodiments, the minimum pressure differential is 50 psid or less.

In one or more embodiments of the method, fuel is supplied to the first inlet on a first fuel line. Fuel from the first fuel line is filtered to a second fuel line, and fuel is supplied to the second inlet of the flow sense valve from the second fuel line. In such embodiments, the method may also involve metering fuel flowing on the second fuel line using a fuel metering valve. The fuel enters the fuel metering valve at a first pressure and exits the fuel metering valve at a second pressure. Further, in such embodiments, flow from the first inlet to the first outlet of the bypass valve is controlled by applying the first pressure and the second pressure to opposite ends of a bypass valve member.

Further, in embodiments of the method, a discharge pressurizing valve (DPV) is arranged downstream of the fuel metering valve, fuel at the second pressure is applied against a DPV valve member to regulate fuel flow through a fuel manifold outlet and through an ecology outlet of the DPV. In certain such embodiments, an actuator regulating valve is arranged downstream of the second outlet of the flow sense valve. The actuator regulating valve is configured to control one or more actuators at a third pressure.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
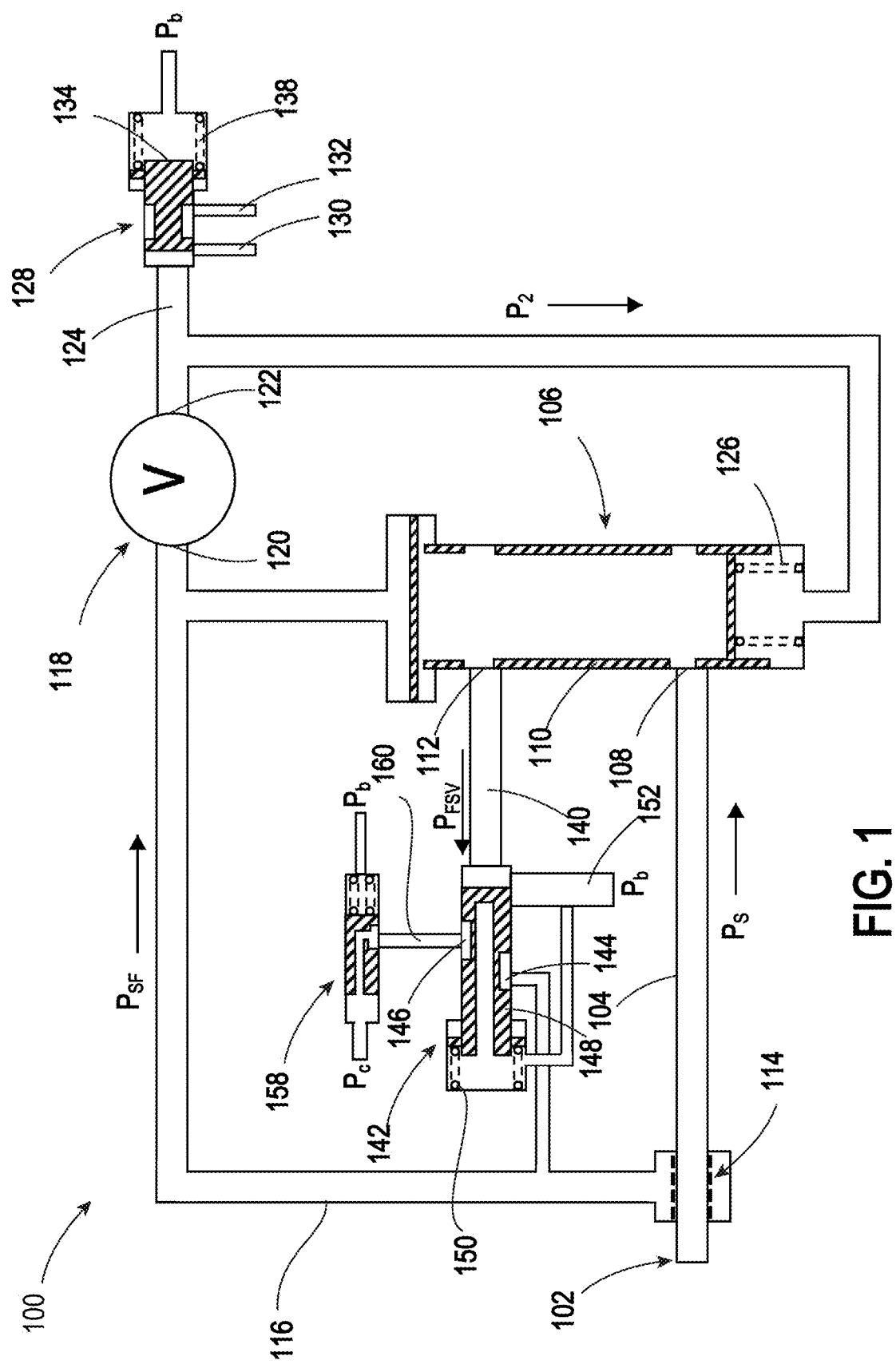
FIG. 1 depicts a fuel system, according to an exemplary embodiment.

FIG. 1 depicts an embodiment of a fuel system 100 according to the present disclosure. The fuel system 100 includes a high pressure flow source inlet 102 to which fuel at pressure $P_S$ is supplied (e.g., from a high pressure pump (not shown)). The fuel flows on first line 104 to a bypass valve (BPV) 106. In particular, fuel flows to a BPV inlet 108 where it is metered by BPV valve member 110 to a BPV outlet 112.

Fuel on the first line 104 is filtered through a wash filter 114 into second line 116. Fuel on second line 116 is also at a high pressure, albeit at a slightly reduced pressure $P_{SF}$ compared to the fuel at pressure $P_S$ on the first line 104 as a result of passing through the wash filter 114. The fuel on second line 116 is provided in one direction to a fuel metering valve (FMV) 118. In particular, fuel on the second line 116 enters the FMV 118 at an FMV inlet 120. The fuel on the second line 116 may also be used to balance a valve member of the FMV 118. Fuel at pressure $P_{SF}$ is also used to position the BPV valve member 110. The FMV 118 can be any of a variety of FMV known in the art to be suitable for the particular applications described herein.

The FMV 118 provides metered fuel through an FMV outlet 122 at a pressure $P_2$ on third line 124. The fuel at pressure $P_2$ along with a biasing element, such as BPV spring 126, is used to position the BPV valve member 110 at an end of the BPV valve member 110 opposite to the fuel at pressure $P_{SF}$. In this way, the BPV 106 maintains a constant pressure drop across the FMV inlet 120 and the FMV outlet 122 of the FMV 118, and as such, the BPV 106 references the differential pressure across the FMV 118. The force due to the differential pressure is countered by the BPV spring 126. This results in proportionality between the differential pressure across the FMV 118 and the position of the BPV valve member 110.

Fuel on the third line 124 also flows at pressure $P_2$ to a discharge pressurizing valve (DPV) 128. The DPV 128 has a first DPV outlet 130 and a second DPV outlet 132. A DPV valve member 134 controls flow through the first DPV outlet 130 to a downstream fuel manifold of an engine and, through the second DPV outlet 132, controls an ecology function of the engine that removes fuel from the engine manifolds upon cessation of engine operation. In the embodiment depicted, the position of the DPV valve member 134 is controlled at an inlet side of the DPV 128 by the fuel at pressure $P_2$ and at an opposite side by a spring 138 and by return pressure $P_b$ through the DPV valve member 134.

An increase in the pressure ($P_{SF}$) upstream of the FMV 118 or a decrease in the pressure ($P_2$) downstream of the FMV 118 will open the BPV outlet 112. A decrease in the pressure upstream ($P_{SF}$) of the FMV 118 or an increase in the pressure ($P_2$) downstream of the FMV 118 will tend to close the BPV outlet 112. Thus, the BPV 106 adjusts the flow returned to the high pressure pump to maintain a constant differential across the FMV 118.

Advantageously, by directing the high pressure flow source inlet 102 directly to the BPV inlet 108 and to the FMV inlet 120 (through the wash filter 114), the fuel system 100 operates at a preload of less than the 350 psid required in conventional fuel systems having an inlet pressurizing valve. In particular, the fuel system 100 is able to operate at a preload of 90 psid ($P_{SF}$-$P_2$) across the FMV 118 and BPV valve member 110.

Upon reaching the requisite preload, fuel flowing through the BPV 106 is discharged at the BPV outlet 112 at pressure $P_{FSV}$ on fourth line 140. The fuel pressure on the fourth line 140 controls, in part, actuation of a flow sense valve (FSV) 142 to allow flow to downstream actuators and to allow return flow from the BPV 106. The FSV 142 senses the bypass flow and remains closed until a minimum bypass flow requirement is met to satisfy metered flow demands before allowing flow to the downstream actuators and motive systems. Until metered flow demands can be satisfied, the FSV 142 throttles flow to the actuators and motive systems, and thereafter, the FSV 142 fully opens and parks. In contrast to the conventional system described above, the FSV 142 is located on a discharge side of the BPV 106 and, thus, is not metering fuel to the BPV 106.

The FSV 142 is provided with a FSV inlet 144 and a FSV outlet 146. Flow between the FSV inlet 144 and the FSV outlet 146 is controlled by FSV valve member 148. The FSV inlet 144 receives fuel flow at pressure $P_{SF}$ on the second line 116. Based on positioning of the FSV valve member 148, fuel flow may be provided through the FSV outlet 146. Positioning of the FSV valve member 148 is determined on one end by the pressure $P_{FSV}$ from the BPV 106 and on the other end by a FSV spring 150 and return pressure $P_b$. In particular, when the pressure $P_{FSV}$ is high enough, the FSV valve member 148 will move (to the left with respect to the orientation of FIG. 1), allowing fuel flow on a return line 152 to the low pressure side of the pressurizing pump upstream of the high pressure inlet 102.

Further, movement of the FSV valve member 148 in the direction that opens flow on the return line 152 will also allow fuel flow from the FSV inlet 144 to the FSV outlet 146. In embodiments, the minimum pressure differential across the FSV valve member 148 at which flow through the FSV outlet 146 occurs is 90 psid or lower, in particular about 50 psid.

Figure 3:
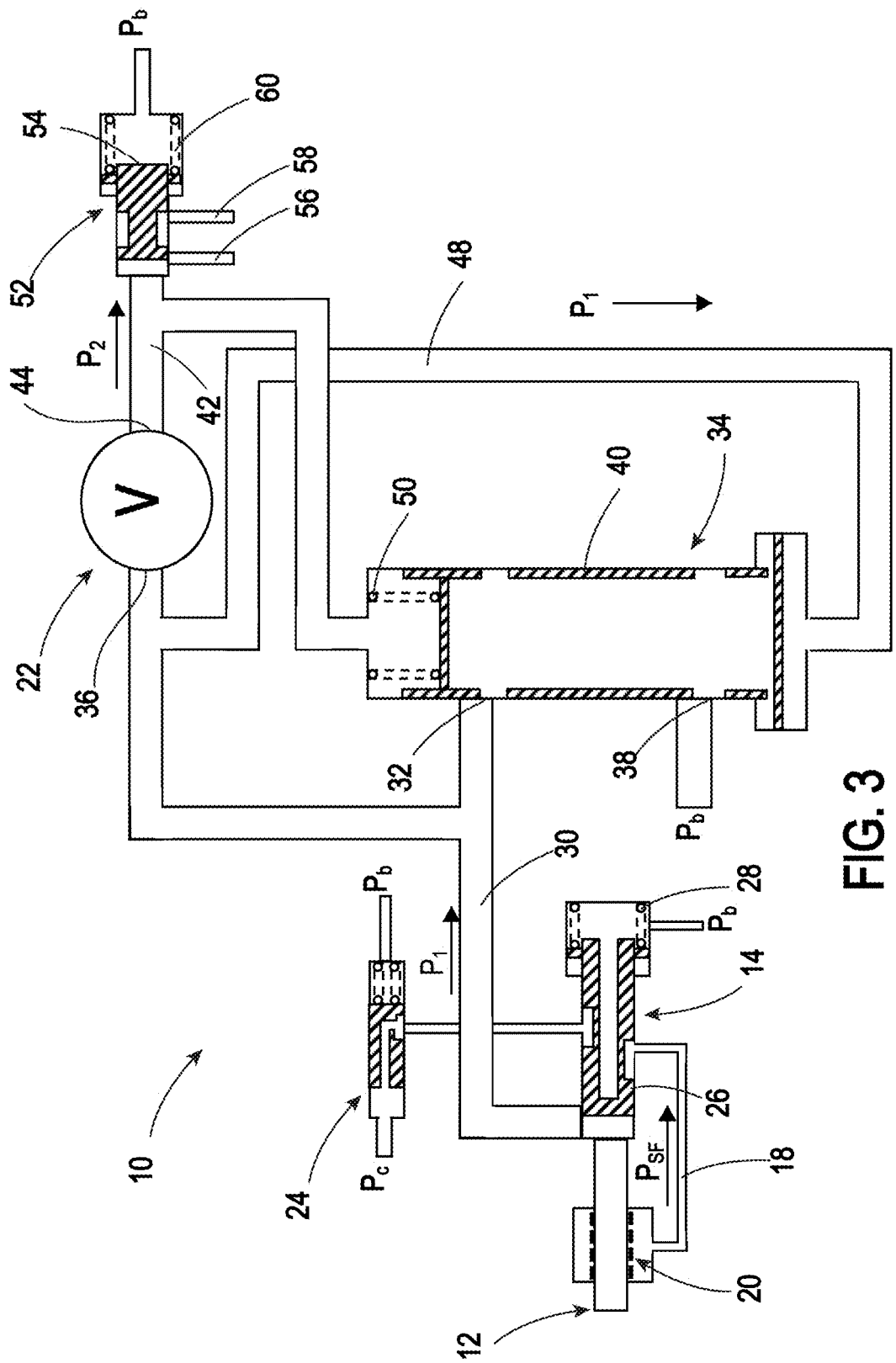
FIG. 3 depicts a prior art fuel system.

As can be seen in FIG. 1, fuel from the PRV outlet 146 flows to an actuator regulating valve (ARV) 158 over a fifth line 160. The ARV 158 controls the high pressure supply of one or more downstream actuators at a pressure $P_C$. Advantageously, the fuel system 100 as described allows for control of the actuators at low speeds, in particular at speeds just above starting speeds where the pump is sized for burn flow and bypass flow alone. Further, the system pressure overall is decreased by eliminating the inlet pressurizing valve (e.g., IPV 14 as shown in FIG. 3), supplying high pressure fuel directly to the BPV 106 and to the FMV 118, which reduces the sensitivity of the FMV 118 to downstream pressure variation. Still further, the fuel system 100 prioritizes burn flow over all other flows.

Figure 2:
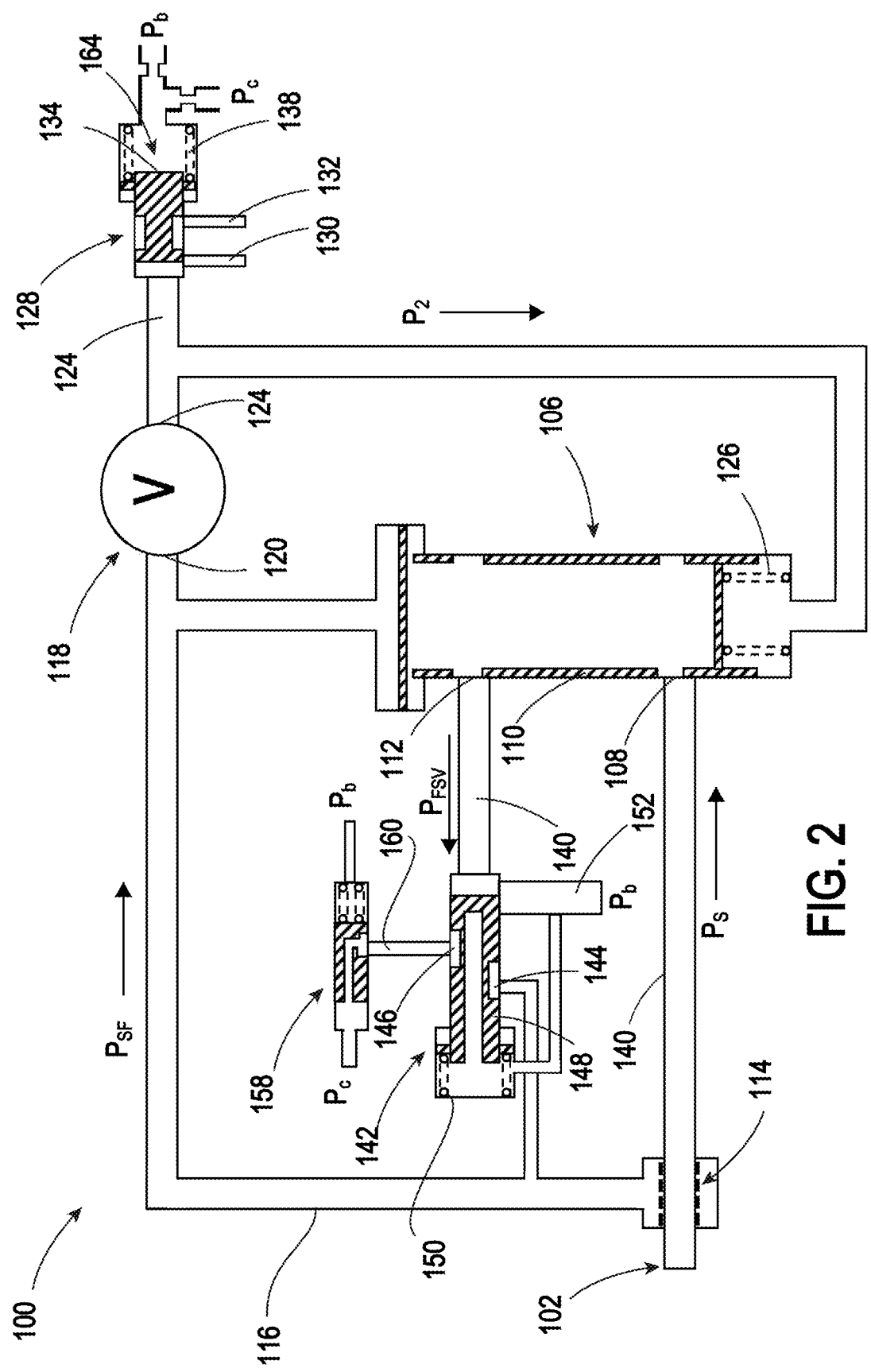
FIG. 2 depicts another fuel system, according to an exemplary embodiment.

FIG. 2 depicts another embodiment of the fuel system 100 in which the same reference numerals are used to refer to the same elements. The fuel system 100 of FIG. 2 is the same as the fuel system 100 of FIG. 1 with the exception that, in the fuel system 100 of FIG. 2, a pressure bridge is provided between the ARV 158 and the DPV 128. In particular, fuel regulated by the ARV 158 at a pressure $P_c$ for control of downstream actuators is also provided in parallel for pressurizing a DPV valve chamber 164 to provide a further counteracting force on the DPV valve member 134. In particular, the DPV 128 includes a DPV valve chamber 164 that is pressurized by return pressure $P_b$, the pressure $P_c$, and the DPV spring 138. In this way, the fuel system 100 operates at higher pressure, e.g., up to 375 psi, for idle speeds while still accommodating low system pressure for start speeds.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel system, comprising:
   a bypass valve (BPV) comprising a BPV inlet, a BPV outlet, and a BPV valve member, wherein the BPV inlet is configured to receive fuel flow at a first pressure and wherein the BPV valve member regulates fuel flow from the BPV inlet to the BPV outlet at a second pressure;
   a fuel metering valve (FMV) comprising an FMV inlet and an FMV outlet, wherein the FMV inlet is configured to receive fuel flow at a third pressure, wherein the third pressure is different than the first pressure, and wherein fuel flow from the FMV outlet is at a fourth pressure; and
   a flow sense valve (FSV) comprising an FSV inlet, an FSV outlet, and an FSV valve member, wherein the FSV inlet is configured to receive fuel flow at the third pressure and wherein the FSV valve member regulates fuel from the FSV inlet to the FSV outlet, fuel from the FSV outlet configured to control downstream actuators;
   wherein a position of the BPV valve member to produce fuel flow through the BPV outlet at the second pressure is controlled at a first end by the third pressure and at a second end by the fourth pressure and a biasing element;
   wherein a position of the FSV valve member to produce fuel flow through the FSV outlet is controlled at least in part by the second pressure.

2. The fuel system of claim 1, wherein a first pressure differential between the third pressure and the fourth pressure is 90 psid or less.

3. The fuel system of claim 2, wherein a second pressure differential across the FSV valve member to provide fuel flow through the FSV outlet is 90 psid or less.

4. The fuel system of claim 1, further comprising a discharge pressurizing valve (DPV), comprising a DPV inlet, a first DPV outlet, and a second DPV outlet, wherein flow from the DPV inlet to the first DPV outlet and to the second DPV outlet is controlled by a DPV valve member; and
   wherein the DPV inlet receives fuel flow from the FMV outlet at the fourth pressure.

5. The fuel system of claim 4, wherein the first DPV outlet provides fuel flow to a downstream fuel manifold and wherein the second DPV outlet provides ecology flow.

6. The fuel system of claim 1, further comprising an actuator regulating valve (ARV) comprising an ARV inlet and an ARV outlet;
   wherein the ARV inlet is in fluid communication with the FSV outlet;
   wherein fuel flow through the ARV outlet regulates the downstream actuators at a fifth pressure.

7. The fuel system of claim 1, further comprising a wash filter provided on a first line carrying fuel at the first pressure, the first line in fluid communication with the BPV inlet, wherein fuel flows through the wash filter at the third pressure to a second line in fluid communication with the FMV inlet and the FSV inlet.

8. A fuel system, comprising:
   a bypass valve (BPV) comprising a BPV inlet, a BPV outlet, and a BPV valve member, wherein the BPV inlet is configured to receive fuel flow at a first pressure and wherein the BPV valve member regulates fuel flow from the BPV inlet to the BPV outlet at a second pressure;
   a fuel metering valve (FMV) comprising an FMV inlet and an FMV outlet, wherein the FMV inlet is configured to receive fuel flow at a third pressure and wherein fuel flow from the FMV outlet is at a fourth pressure; and
   a flow sense valve (FSV) comprising an FSV inlet, an FSV outlet, and an FSV valve member, wherein the FSV inlet is configured to receive fuel flow at the third pressure and wherein the FSV valve member regulates fuel from the FSV inlet to the FSV outlet, fuel from the FSV outlet configured to control downstream actuators;
   an actuator regulating valve (ARV) comprising an ARV inlet and an ARV outlet;
   wherein the ARV inlet is in fluid communication with the FSV outlet;
   wherein fuel flow through the ARV outlet regulates the downstream actuators at a fifth pressure
   wherein a position of the BPV valve member to produce fuel flow through the BPV outlet at the second pressure is controlled at a first end by the third pressure and at a second end by the fourth pressure and a biasing element;
   wherein a position of the FSV valve member to produce fuel flow through the FSV outlet to the ARV inlet is controlled at least in part by the second pressure; and
   a discharge pressurizing valve (DPV), the DPV comprising a DPV inlet, at least one DPV outlet, and a DPV valve member that controls fuel flow from the DPV inlet to the at least one DPV outlet, wherein the DPV inlet receives fuel flow from the FMV outlet at the fourth pressure and wherein a flow bridge is provided between the ARV and the DPV such that fuel flow at the fifth pressure biases the DPV valve member against the fuel flow at the fourth pressure.

9. A control system for one or more actuators, comprising:
a bypass valve (BPV) having a BPV inlet and a BPV outlet;
a flow sense valve (FSV) having an FSV inlet, an FSV outlet, and an FSV valve member, the FSV valve member having a first end and a second end;
an actuator regulating valve (ARV) having an ARV inlet and an ARV outlet;
wherein fuel flow through the BPV outlet applies a pressure to the first end of the FSV valve member;
wherein the ARV inlet is in fluid communication with the FSV outlet;
wherein fluid is able to flow from the FSV inlet to the FSV outlet at a minimum pressure differential across the FSV valve member measured between the first end and the second end of 90 psid or less; and
wherein flow from the ARV outlet controls the one or more actuators.

10. A control system for one or more actuators, comprising:
a bypass valve (BPV) having a BPV inlet and a BPV outlet;
a flow sense valve (FSV) having an FSV inlet, an FSV outlet, and an FSV valve member;
an actuator regulating valve (ARV) having an ARV inlet and an ARV outlet;
wherein fuel flow through the BPV outlet applies a pressure to the FSV valve member;
wherein the ARV inlet is in fluid communication with the FSV outlet wherein fluid is able to flow from the FSV inlet to the FSV outlet at a minimum pressure differential across the FSV valve member of 90 psid or less; and
wherein flow from the ARV outlet controls the one or more actuators; and
wherein the ARV provides a pressure bridge to a discharge pressurizing valve configured to control fuel flow to a fuel manifold and to an ecology system.

11. The control system of claim 10, wherein the minimum pressure differential is 50 psid or less.

12. The control system of claim 10, wherein fuel flow from the BPV inlet to the BPV outlet is provided at a pressure differential of 90 psid or less across a BPV valve member.

13. The control system of claim 12, further comprising a fuel metering valve (FMV) having an FMV inlet and an FMV outlet, the FMV outlet being in fluid communication with a discharge pressurizing valve configured to regulate fuel flow to a fuel manifold;
wherein fuel is at a first pressure at the FMV inlet and at a second pressure at the FMV outlet; and
wherein the pressure differential across the BPV valve member is a difference between the first pressure and the second pressure.

14. A method, comprising:
supplying fuel to a first inlet of a bypass valve;
discharging fuel from a first outlet of the bypass valve such that the fuel from the first outlet of the bypass valve applies a pressure to a first end of a valve member of a flow sense valve;
regulating flow from a second inlet of the flow sense valve to a second outlet of flow sense valve based on a position of the valve member of the flow sense valve, wherein a minimum pressure differential across the valve member measured between the first end and a second end of the valve member to permit flow from the second inlet to the second outlet is 90 psid or less and wherein flow from the second outlet controls one or more downstream actuators.

15. The method of claim 14, wherein the minimum pressure differential is 50 psid or less.

16. The method of claim 14, wherein fuel is supplied to the first inlet on a first fuel line and wherein the method further comprises:
filtering fuel from the first fuel line to a second fuel line; and
supplying fuel from the second fuel line to the second inlet of the flow sense valve.

17. The method of claim 16, further comprising:
metering fuel flowing on the second fuel line using a fuel metering valve, wherein the fuel enters the fuel metering valve at a first pressure and exits the fuel metering valve at a second pressure.

18. The method of claim 17, further comprising:
controlling flow from the first inlet to the first outlet of the bypass valve by applying the first pressure and the second pressure to opposite ends of a bypass valve member.

19. The method of claim 17, wherein a discharge pressurizing valve (DPV) is arranged downstream of the fuel metering valve and wherein the method further comprises:
applying fuel at the second pressure against a DPV valve member to regulate fuel flow through a fuel manifold outlet and through an ecology outlet of the DPV.

20. The method of claim 14, wherein an actuator regulating valve is arranged downstream of the second outlet of the flow sense valve, wherein the actuator regulating valve is configured to control one or more actuators at a third pressure.

* * * * *

UNITED STATES PATENT AND TRADEMARK OFFICE
CERTIFICATE OF CORRECTION

| | |
|---|---|
| PATENT NO. | : 11,994,076 B2 |
| APPLICATION NO. | : 17/219485 |
| DATED | : May 28, 2024 |
| INVENTOR(S) | : Michael L. Hahn |

It is certified that error appears in the above-identified patent and that said Letters Patent is hereby corrected as shown below:

In the Claims

Claim 10, Line 12 reads:
"FSV outlet wherein fluid is able to flow from the FSV"
Should read:
--FSV outlet; wherein fluid is able to flow from the FSV--

Signed and Sealed this
Tenth Day of December, 2024

*Katherine Kelly Vidal*

Katherine Kelly Vidal
*Director of the United States Patent and Trademark Office*